(12) United States Patent
Yoshida

(10) Patent No.: US 8,905,886 B2
(45) Date of Patent: Dec. 9, 2014

(54) GEAR DEVICE

(75) Inventor: Shunsuke Yoshida, Tsu (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 13/581,362

(22) PCT Filed: Feb. 18, 2011

(86) PCT No.: PCT/JP2011/000919
§ 371 (c)(1),
(2), (4) Date: Aug. 27, 2012

(87) PCT Pub. No.: WO2011/108211
PCT Pub. Date: Sep. 9, 2011

(65) Prior Publication Data
US 2012/0322608 A1   Dec. 20, 2012

(30) Foreign Application Priority Data

Mar. 5, 2010   (JP) ................. 2010-048922

(51) Int. Cl.
*F16L 17/02*   (2006.01)
*F16H 23/00*   (2006.01)
*F16H 1/32*    (2006.01)

(52) U.S. Cl.
CPC ............ *F16H 1/32* (2013.01); *F16H 2001/323* (2013.01)
USPC ............................ 475/162; 277/625; 475/331

(58) Field of Classification Search
USPC .......... 475/331, 162, 163; 277/184, 596, 616, 277/625, 643
See application file for complete search history.

(56) References Cited

U.S. PATENT DOCUMENTS

| | | | |
|---|---|---|---|
| 6,663,110 B2 | 12/2003 | Platner | |
| 7,063,328 B2 * | 6/2006 | Smith, III | 277/607 |
| 7,521,827 B2 * | 4/2009 | Orlowski et al. | 310/68 R |
| 7,935,017 B2 * | 5/2011 | Kurita et al. | 475/162 |
| 8,444,520 B2 * | 5/2013 | Nakamura et al. | 475/162 |
| 2003/0107184 A1 | 6/2003 | Platner | |
| 2004/0201176 A1 * | 10/2004 | Bjornson | 277/370 |
| 2009/0124446 A1 | 5/2009 | Miyoshi | |
| 2011/0015024 A1 | 1/2011 | Nakamura et al. | |

FOREIGN PATENT DOCUMENTS

| | | |
|---|---|---|
| DE | 10 2008 036 629 A | 2/2009 |
| JP | 2003-202082 | 7/2003 |
| JP | 2007-278355 | 10/2007 |
| JP | 2007-321970 | 12/2007 |
| JP | 2009-210030 | 9/2009 |
| WO | 2009/119737 | 10/2009 |

* cited by examiner

*Primary Examiner* — Justin Holmes
*Assistant Examiner* — Stacey Fluhart
(74) *Attorney, Agent, or Firm* — George E. Hespos; Michael J. Porco; Matthew T. Hespos

(57) ABSTRACT

Disclosed is a gear device which comprises an outer cylinder fixable to one of two counterpart member; a crankshaft; a carrier configured to be fixable to the other counterpart member and formed with a through-hole, wherein the carrier is adapted to be relatively rotated with respect to the outer cylinder in interlocking relation with rotation of the crankshaft; and a cylindrical body disposed in the through-hole of the carrier. The through-hole of the carrier has an inner peripheral surface formed with an outward groove. The cylindrical body has an outer peripheral surface formed with an inward groove in opposed relation to the outward groove of the carrier. The gear device is provided with an O-ring disposed to extend from an inside of the outward groove to an inside of the inward groove.

4 Claims, 4 Drawing Sheets

GEAR DEVICE

TECHNICAL FIELD

The present invention relates to a gear device.

BACKGROUND ART

Heretofore, there has been known a gear device designed to output a rotational force at a rotational speed reduced with respect to an input rotational speed, by using an eccentric portion of a crankshaft to cause an externally toothed gear to be oscillatingly rotated while being meshed with internal teeth, as disclosed in WO 2009/119737 A1. As illustrated in FIG. 3, in the gear device disclosed in WO 2009/119737 A1, a through-hole 61c is formed in a central region of a carrier 61 having an end plate 61a and a basal section 61b, and a cylindrical body 63 for facilitating insertion of a cable is disposed in the through-hole 61c. The cylindrical body 63 has an intermediate portion formed with a groove 63a, and a retaining ring 65 is fitted onto the intermediate portion while being fitted into the groove 63a. One end of the cylindrical body 63 and the retaining ring 65 are clamped from opposite sides by the endplate 61a and the basal section 61b, so that the cylindrical body 63 is fixed to the carrier 61.

WO 2009/119737 A1 discloses another configuration designed to fix the cylindrical body using a sealing ring. As illustrated in FIG. 4, in this configuration, a sealing ring 69 is fitted into the groove 63a formed in the intermediate portion of the cylindrical body 63. The sealing ring 69 is pressed against and brought into close contact with an inner peripheral surface of the through-hole 61c in the end plate 61a, by an elastic force thereof, so that the cylindrical body 63 is fixed to the carrier 61.

In the configuration illustrated in FIG. 3, i.e., the configuration designed to fix the cylindrical body 63 to the carrier 61 using the retaining ring 65, one end of the cylindrical body 63 and the retaining ring 65 are clamped from opposite sides by the end plate 61a and the basal section 61b. For this purpose, in a production process of the gear device, before assembling the end plate 61a and the basal section 61b together to form the carrier 61, it is necessary to install the cylindrical body 63 to the carrier 61. Specifically, it is necessary to insert the cylindrical body 63 having the retaining ring 65 attached thereto, into the through-hole 61c in the basal section 61b, and then install the end plate 61a to the basal section 61b. Moreover, it is necessary to ensure dimensional accuracy of the carrier 61 and the cylindrical body 63, which raises a need for dimensional control for the carrier 61 and the cylindrical body 63. Therefore, the configuration illustrated in FIG. 3 has a problem that a gear device production operation becomes cumbersome and complicated. On the other hand, as to the configuration using the sealing ring 69 as illustrated in FIG. 4, the Patent Document 1 mentions that the sealing ring 69 is pressed against the through-hole 61c, and the cylindrical body 63 is fixed to the carrier 61 by an elastic force of the sealing ring 69. However, in reality, the cylindrical body 63 is liable to be displaced in an axial direction thereof, which causes a problem that the cylindrical body 63 is likely to drop off.

SUMMARY OF THE INVENTION

An object of the present invention is to solve the above problems.

More specifically, it is an object of the present invention to reliably prevent drop-off of the cylindrical body while suppressing the situation where a gear device production operation becomes cumbersome and complicated.

According to a first aspect of the present invention, there is provided a gear device which is installable between two counterpart members to transmit a rotational force while reducing a rotational speed at a predetermined speed reduction ratio. The gear device comprises: a first member fixable to one of the counterpart members; a crankshaft; a second member configured to be fixable to the other counterpart member and formed with a through-hole, wherein the second member is adapted to be relatively rotated with respect to the first member in interlocking relation with rotation of the crankshaft; and a cylindrical body disposed in the through-hole of the second member. The through-hole of the second member has an inner peripheral surface formed with an outward groove. The cylindrical body has an outer peripheral surface formed with an inward groove in opposed relation to the outward groove of the second member. The gear device is provided with an O-ring disposed to extend from an inside of the outward groove to an inside of the inward groove.

DESCRIPTION OF EMBODIMENTS

With reference to the drawings, the present invention will now be described in detail, based on an embodiment thereof.

A gear device according to one embodiment of the present invention is usable, for example, as a speed reducer in turning sections such as a turning body and an arm joint of a robot, or turning sections of various machine tools. The following description of this embodiment will be made about one example where the gear device is used in a turning body of a robot.

Figure 1:
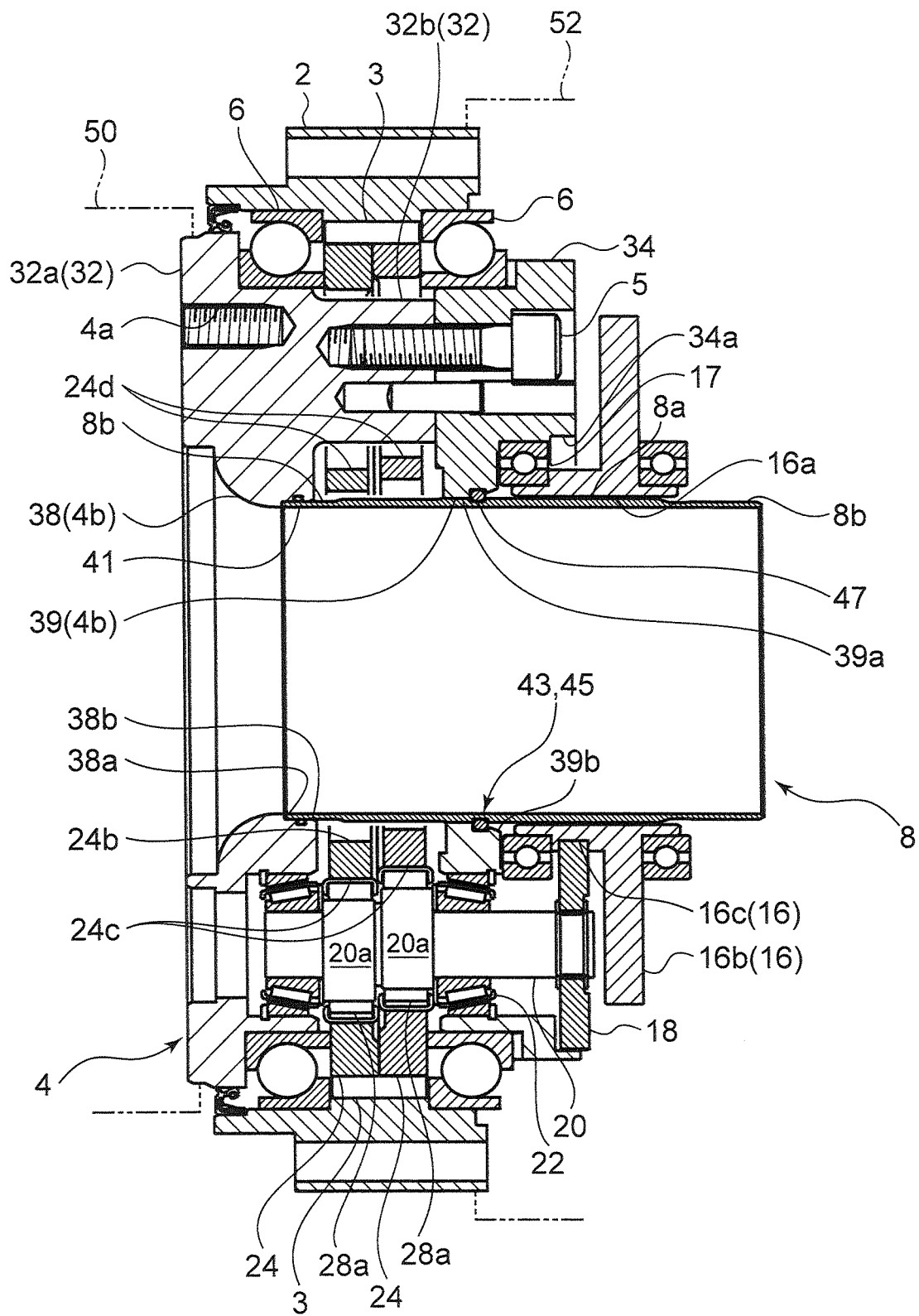
FIG. 1 is a sectional view illustrating a gear device according to one embodiment of the present invention.

As illustrated in FIG. 1, the gear device according to this embodiment is installable between a base 50 and a turning body 52 to transmit a rotational force while reducing a rotational speed at a predetermined speed reduction ratio. The turning body 52 is a member which falls into the concept of a first one of two counterpart members, and the base 50 is a member which falls into the concept of the other counterpart member. The gear device according to this embodiment comprises an outer cylinder 2, an internal-tooth pin 3, a carrier 4, a main bearing 6, a cylindrical body 8, a central gear member 16, a crankshaft gear 18, a crankshaft 20, a crankshaft bearing 22, and an oscillating gear 24.

The outer cylinder 2 is a member which falls into the concept of a first member fixable to the first counterpart member, and functions as a casing defining an outer surface of the gear device. The outer cylinder 2 is formed in an approximately circular cylindrical shape. The outer cylinder 2 is fastened to the turning body 52, for example, which is a turning body of a robot. A large number of the internal-tooth pins 3 are arranged on an inner surface of the outer cylinder 2 at even intervals in a circumferential direction thereof. The internal-tooth pins 3 function as internal teeth with which the oscillating gear 24 composed of an externally toothed gear is meshed. The number of teeth of the oscillating gear 24 is set to be slightly less than the number of the internal-tooth pins 3. In this embodiment, the number of the oscillating gears 24 is two (a plurality).

The carrier 4 is fastened to the base 50, for example, which is fixed onto an installation surface. The carrier 4 is a member which falls into the concept of a second member adapted to be relatively rotated with respect to the first member. The carrier 4 is housed within the outer cylinder 2 while being disposed coaxially with the outer cylinder 2. In this embodiment, the outer cylinder 2 is adapted to be relatively rotated with respect to the carrier 4, in coaxial relation with the carrier 4. The carrier 4 is provided with a plurality of bolt-insertion holes 4a. The carrier 4 is fastened to the base 50 by a plurality of bolts (illustration is omitted) each inserted into a respective one of the bolt-insertion holes 4a. When the outer cylinder 2 is relatively rotated with respect to the carrier 4, the turning body 52 is turned with respect to the base 50.

In this embodiment, the carrier 4 is fixed to the base 50 and kept immovable, and the outer cylinder 2 is fastened to the turning body 52 in a turnable manner. It is understood that an alternative configuration may be used in which the outer cylinder 2 is fixed to the base 50, and the carrier 4 is fastened to the turning body.

A pair of the main bearings 6, 6 are provided in axially spaced-apart relation. The carrier 4 is supported by the outer cylinder 2 through the main bearings 6, 6, so that it is relatively rotatable with respect to the outer cylinder 2. The carrier 4 comprises a basal section 32 and an end plate section 34. The basal section 32 and the end plate section 34 are fastened together to allow the oscillating gears 24 to be housed between the main bearings 6, 6.

Within the outer cylinder 2, the basal section 32 has a basal plate portion 32a disposed adjacent to an end portion of the outer cylinder 2, and a shaft portion 32b axially extending from the basal plate portion 32a toward the end plate section 34. The shaft portion 32b is fastened to the end plate section 34 by a bolt 5. In this way, the basal section 32 and the end plate section 34 are integrated together.

The carrier 4 has a through-hole 4b provided in a radially central region thereof to axially penetrate therethrough. The through-hole 4b includes a basal-section penetrating zone 38 formed in the basal plate portion 32a of the basal section 32 and an end-plate penetrating zone 39 formed in the end plate section 34. The end plate section 34 has a central concave portion 34a formed in an end face thereof on a side opposite to the basal plate portion 32a. One end of the end-plate penetrating zone 39 is opened to a bottom surface of the central concave portion 34a.

The central gear member 16 integrally has: a driven gear 16b meshed with a driving gear (illustration is omitted) adapted to be driven by a non-illustrated driving source (motor); and a transmitting gear 16c formed in concentric relation to the driven gear 16b. The central gear member 16 is provided in a radially central region of the end plate section 34, and a part of the central gear member 16 enters into the central concave portion 34a. In this state, the central gear member 16 is attached to the end plate section 34 through a bearing 17. In this way, the central gear member 16 is adapted to be rotatable coaxially with the carrier 4.

The central gear member 16 has an insertion hole 16a provided in a central region thereof to axially penetrate therethrough. The insertion hole 16a is formed to allow the cylindrical body 8 to be inserted thereinto. Specifically, the insertion hole 16a has an inner diameter greater than an outer diameter of the cylindrical body 8. Thus, a gap is provided between an inner surface of the insertion hole 16a and an outer surface of the cylindrical body 8.

The cylindrical body 8 is inserted into the through-hole 4b to become coaxial with the carrier 4, and disposed to extend over the basal-section penetrating zone 38 and the end-plate penetrating zone 39. The cylindrical body 8 is composed of a member having a circular ring-shaped cross-section, and disposed to linearly extend in an axial direction of the carrier 4. In this state, a distribution cable (illustration is omitted) or the like is inserted into the cylindrical body 8. The cylindrical body 8 prevents contact between the cable and each gear in the gear device, while preventing a lubricant or the like from entering into an inside of the cylindrical body. The cylindrical body 8 comprises: an intermediate portion 8a having a predetermined wall thickness; and a small-diameter portion 8b continuous with each of axially opposite ends of the intermediate portion 8a and having a wall thickness less than that of the intermediate portion 8a. That is, the small-diameter portion 8b is provided as a respective one of opposite end portions of the cylindrical body 8. The small-diameter portion 8b has an outer diameter slightly less than an outer diameter of the intermediate portion 8a. In other words, the end portion of the cylindrical body 8 is formed to have an outer diameter less than that of the intermediate portion 8a.

The basal-section penetrating zone 38 has a circular cross-section having a center on a central axis of the carrier 4, and gradually expands flaringly in a direction from an intermediate region thereof to an end thereof on a side opposite to the end plate section 34. Further, the intermediate region of the basal-section penetrating zone 38 has an inner peripheral surface formed with a stepped portion 38a for allowing one end of the cylindrical body 8 to be brought into contact therewith on the end plate section 34 side. In the basal-section penetrating zone 38, an area closer to the end plate section 34 with respect to the stepped portion 38a is radially expanded with respect to an inner edge of the stepped portion 38a. The radially expanded area is formed as a parallel portion 38b axially extending with the same diameter. The parallel portion 38b has an inner diameter corresponding to the outer diameter of the small-diameter portion 8b of the cylindrical body 8. The small-diameter portion 8b of the cylindrical body 8 is fitted into the parallel portion 38b until it is brought into contact with the stepped portion 38a. Thus, one end portion (base end portion) of the cylindrical body 8 is immovably supported by the basal plate portion 32a.

The inner peripheral surface of the basal-section penetrating zone 38 has a cross-sectionally rectangular-shaped recess formed in the parallel portion 38b. This recess is formed to extend over the entire circumference of the inner peripheral surface of the basal-section penetrating zone 38, and an O-ring 41 is installed in the recess.

The O-ring 41 is made of an elastic material such as rubber, and adapted to be pressed against an outer peripheral surface of the small-diameter portion 8b of the cylindrical body 8 by an elastic force thereof. Thus, the O-ring 41 functions as an anti-rotation member for preventing rotation of the cylindrical body 8, as well as a sealing member. Specifically, the O-ring 41 is pressed against and brought into close contact with the outer peripheral surface of the cylindrical body 8 to suppress an axial rotation of the cylindrical body 8 with respect to the carrier 4, while preventing a lubricant from entering from an outside into an inside of the cylindrical body 8.

The end-plate penetrating zone 39 has a circular cross-section having a center on a central axis of the carrier 4. In end-plate penetrating zone 39, an area from an end thereof on the side of the basal plate portion 32a to an intermediate region thereof is formed as a parallel portion 39a axially extending with the same diameter. The parallel portion 39a has an inner diameter corresponding to the outer diameter of the intermediate portion 8a of the cylindrical body 8. The intermediate portion 8a of the cylindrical body 8 is inserted into the parallel portion 39a. In this state, an inner surface of the parallel portion 39a is in close contact with an outer surface of the intermediate portion 8a of the cylindrical body 8. Thus, the end plate section 34 supports the axially intermediate portion of the cylindrical body 8 to prevent wobbling in a radial direction thereof.

Figure 2:
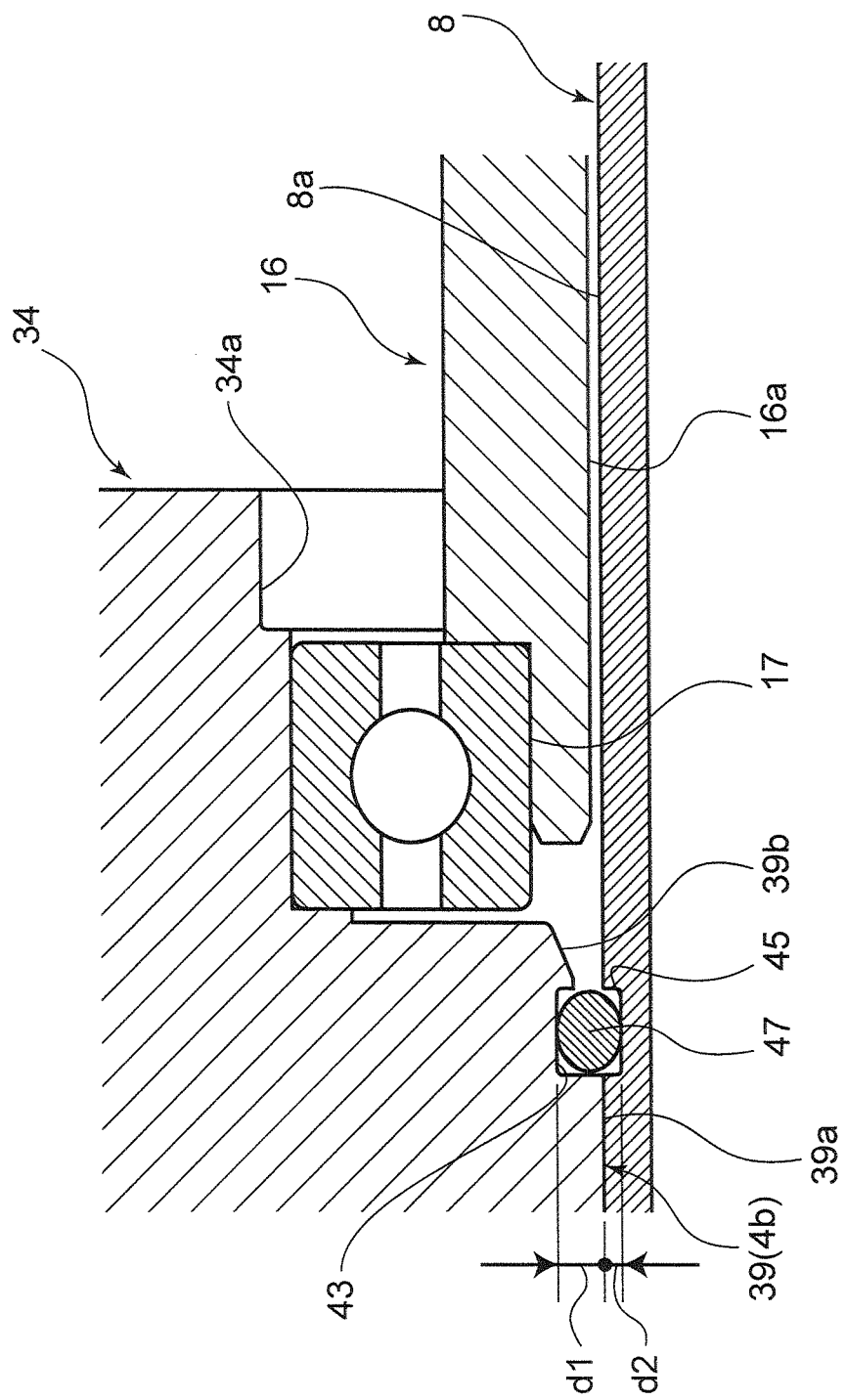
FIG. 2 is a diagram partially enlargedly illustrating the gear device.
Figure 3:
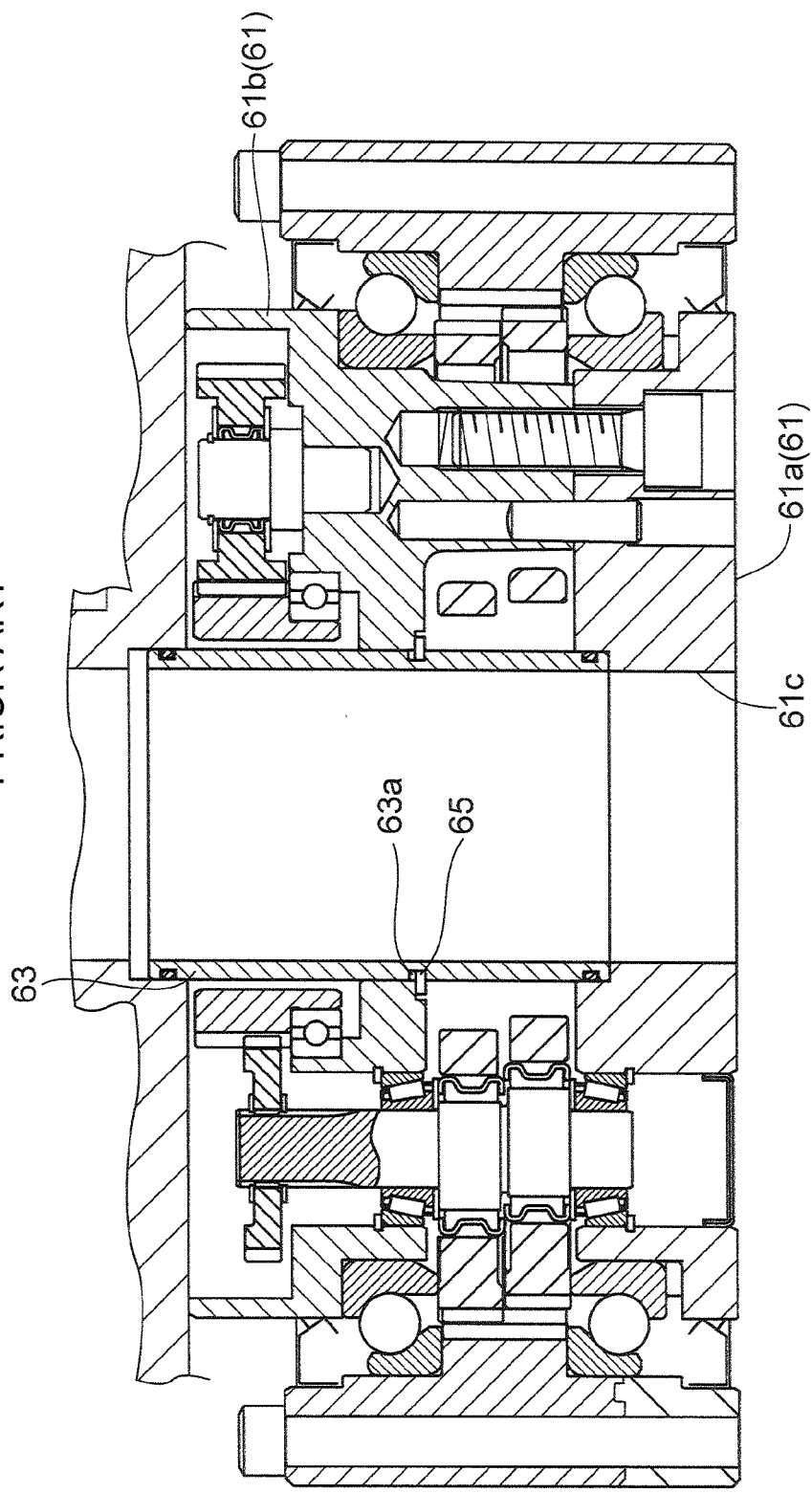
FIG. 3 is a sectional view of a conventional gear device.
Figure 4:
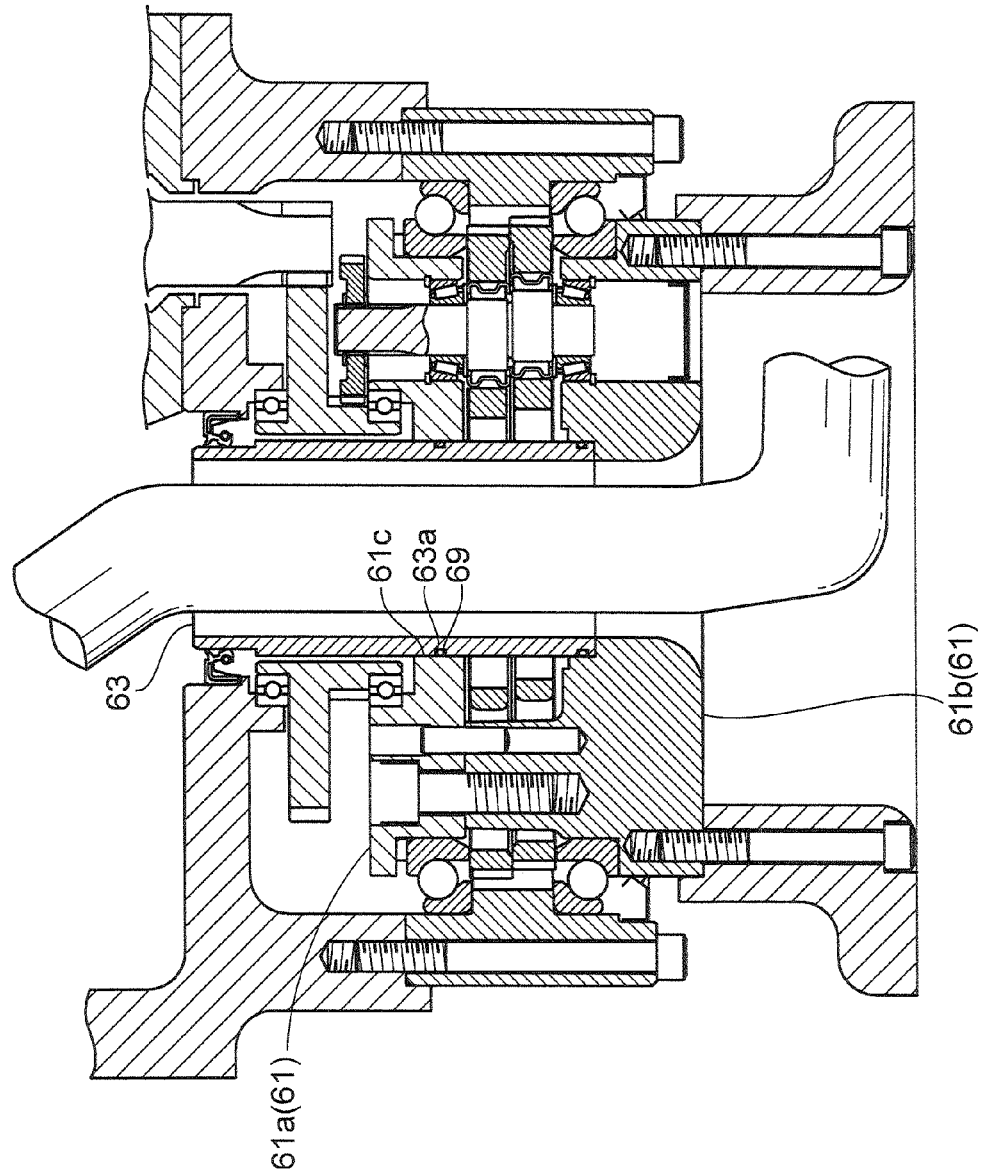
FIG. 4 is a sectional view of a conventional gear device.

As enlargedly illustrated in FIG. 2, the intermediate region of the end-plate penetrating zone 39 is provided with an outward groove 43. The outward groove 43 is formed to extend over the entire circumference of an inner peripheral surface of the end-plate penetrating zone 39. The outward groove 43 is composed of a rectangular groove. More specifically, the outward groove 43 has two axially opposed wall surfaces each extending in a direction perpendicular to the axial direction of the cylindrical body 8.

In the end plate section 34, the inner peripheral surface of the end-plate penetrating zone 39 has an axial edge subjected to chamfering. More specifically, in the inner peripheral surface of the end-plate penetrating zone 39, an edge thereof on a side opposite to the basal section 32 is formed as an inclined portion 39b which is inclined to become gradually distant from the cylindrical body 8 along with an increase in axial distance from the basal section 32. The inclined portion 39b extends to connect to the outward groove 43. One of the opposed wall surfaces of the outward groove 43 on the side of the inclined portion has a height dimension less than that of the other wall surface. This allows the cylindrical body 8 having an aftermentioned O-ring 47 fitted thereonto to be easily inserted into the outward groove 43 from the side of the inclined portion.

The intermediate portion 8a of the cylindrical body 8 is provided with an inward groove 45 at a position corresponding to the outward groove 43. The inward groove 45 is formed to extend over the entire circumference of the outer peripheral surface of the cylindrical body 8. The inward groove 45 is composed of a rectangular groove. More specifically, the inward groove 45 has two axially opposed wall surfaces each extending in a direction perpendicular to the outer peripheral surface of the cylindrical body 8.

The outward groove 43 of the end plate section 34 and the inward groove 45 of the cylindrical body 8 are disposed opposed to each other, so that an annular space having an approximately rectangular cross-section is defined by the outward groove 43 and the inward groove 45. The annular space is defined around the cylindrical body 8, and an O-ring 47 is installed in the annular space. A depth d1 of the outward groove 43 and a depth d2 of the inward groove 45 are set to become different from each other. This prevents a corner of the outward groove 43 or the inward groove 45 from exerting a force on a thicknesswise central portion of the O-ring 47, even if the cylindrical body 8 is displaced in the axial direction.

The O-ring 47 is made of an elastic material such as rubber, and adapted to be pressed against an inner peripheral surface of the outward groove 43 and an outer peripheral surface of the inward groove 45. Thus, the O-ring 47 functions as a member for suppressing an axial displacement of the cylindrical body 8, as well as an anti-rotation member for preventing rotation of the cylindrical body 8.

As illustrated in FIG. 1, after penetrating through the end plate section 34 and the central gear member 16, the cylindrical body 8 further extends outwardly. More specifically, the axially intermediate portion 8a of the cylindrical body 8 is inserted into the end-plate penetrating zone 39, and the other end portion (distal end portion) of the cylindrical body 8 extends toward the turning body 52 while protruding axially outwardly from the end plate section 34 and the central gear member 16.

The gear device is provided with a plurality of the crankshafts 20 which are arranged around the cylindrical body 8 at even intervals in the circumferential direction. A plurality of the crankshaft gears 18 are attached to respective ends of the crankshafts 20. Each of the crankshaft gears 18 is meshed with the transmitting gear 16c of the central gear member 16. Upon rotation of the central gear member 16, each of the crankshaft gears 18 is rotated accordingly. Thus, each of the crankshafts 20 having the crankshaft gears 18 attached thereto will be rotated.

Each of the crankshafts 20 is attached to the carrier 4 through a pair of the crankshaft bearings 22. Thus, the crankshaft 20 is adapted to be rotatable around its own axis. In other words, the crankshaft 20 is rotatably supported by the carrier 4.

The crankshaft 20 has a plurality of (in this embodiment, two) eccentric portions 20a. The eccentric portions 20a are disposed at respective positions between the pair of crankshaft bearings 22 in side-by-side relation in an axial direction of the crankshaft 20. Each of the eccentric portions 20a is formed in a columnar shape eccentrically offset from a central axis of the crankshaft 20 by a predetermined eccentric amount. The eccentric portions 20a are disposed to have a phase difference therebetween by a predetermined phase angle.

The two oscillating gears 24 are attached to respective ones of the two eccentric portions 20a of each of the crankshafts 20. The oscillating gear 24 is formed to be slightly smaller than an inner diameter of the outer cylinder 2. Each of the oscillating gears 24 is adapted, when the crankshafts 20 are rotated, to be oscillatingly rotated while being meshed with the internal-tooth pins 3 on the inner surface of the outer cylinder 2, in interlocking relation with an eccentric rotation of the corresponding eccentric portions 20a.

Each of the oscillating gears 24 has a central through-hole 24b, a plurality of eccentric-portion insertion holes 24c, and a plurality of shaft-portion insertion holes 24d.

The cylindrical body 8 is inserted into the central through-hole 24b with a play gap therebetween.

The plurality of eccentric-portion insertion holes 24c are provided in the oscillation gear 24 around the central through-hole 24b at even intervals in the circumferential direction. One of the eccentric portions 20a of each of the crankshafts 20 is inserted into a respective one of the eccentric-portion insertion holes 24c, while interposing a roller bearing 28a therebetween.

The plurality of shaft-portion insertion holes 24d are provided in the oscillation gear 24 around the central through-hole 24b at even intervals in the circumferential direction. Each of the shaft-portion insertion holes 24d is provided at a position between circumferentially adjacent ones of the eccentric-portion insertion holes 24c. Each of a plurality of the shaft portions 32b of the carrier 4 is inserted into a respective one of the shaft-portion insertion holes 24d with a play gap therebetween.

An operation of the gear device according to this embodiment will be described below.

When the driven gear 16b of the central gear member 16 is rotated by receiving a rotational driving force from the non-illustrated driving source, the rotational driving force of the driven gear 16b is transmitted to the respective crankshaft gears 18 via the transmitting gear 16c. Thus, each of the crankshafts 20 is rotated around its own axis.

Along with the rotation of each of the crankshafts 20, the eccentric portions 20a of the crankshaft 20 are eccentrically rotated. Each of the oscillating gears 24 is oscillatingly rotated interlockingly with the eccentric rotation of a respective one of the eccentric portions 20a. Specifically, the oscillating gear 24 is oscillatingly rotated while being meshed with the internal-tooth pins 3 on the inner surface of the outer cylinder 2. During the oscillating rotation of the oscillating gear 24, a rotational force causing rotation of the carrier 4 is applied to the carrier 4. However, in this embodiment, the carrier 4 is fixed to the base 50 and thereby immovable. Thus, based on a resulting reaction force, the outer cylinder 2 and the turning body 52 are relatively rotated with respect to the carrier 4 and base 50 at a rotational speed reduced from an input rotational speed at a predetermined speed reduction ratio.

A production process for the gear device according to this embodiment will be briefly described below.

Firstly, after installing the crankshafts 20 to the oscillation gears 24, the oscillation gears 24 having the crankshafts 20 installed thereto and one of the main bearings 6 are installed to the basal section 32 of the carrier 4. Then, the outer cylinder 2 and the other main bearing 6 are sandwiched between the basal section 32 and the end plate section 34, and, in this state, the end plate section 34 is fastened to the basal section 32. On the other hand, the O-ring 41 is fitted into the recess of the basal plate portion 32a, and the O-ring 47 is fitted into the inward groove 45 of the cylindrical body 8.

Subsequently, the cylindrical body 8 having the O-ring 47 fitted thereonto is inserted into the through-hole 4b of the carrier 4 from the side of the central concave portion 34a of the end plate section 34. In this operation, the end portion (small-diameter portion 8b) of the cylindrical body 8 is inserted to pass through the end-plate penetrating zone 39 without contact with the inner peripheral surface of the end-plate penetrating zone 39 of the end plate section 34, and finally inserted into the basal-section penetrating zone 38. The O-ring 47 installed in the inward groove 45 is moved to pass through the inclined portion 39b of the end-plate penetrating zone 39 while being brought into slide contact with the inclined portion 39b, and finally fitted into the outward groove 43 of the end plate section 34. Thus, the cylindrical body 8 is fixed to the basal section 32 and the end plate section 34. Subsequently, the bearing 17 is attached to the end plate section 34, and the central gear member 16 is attached to the end plate section 34. In this way, the gear device is completed.

As described above, in the gear device according to the above embodiment of the present invention, the inward groove 45 is formed in the outer peripheral surface of the cylindrical body 8, and the outward groove 43 is formed in the inner peripheral surface of the through-hole 4b of the carrier 4 (the end-plate penetrating zone 39), wherein the gear device is provided with the O-ring 47 disposed to extend from an inside of the inward groove 45 and an inside of the outward groove 43. Thus, even if the cylindrical body 8 is urged to be displaced in the axial direction with respect to the carrier 4, the O-ring 47 is brought into contact with respective wall surfaces of the inward groove 45 and the outward groove 43, so that it becomes possible to restrict the axial displacement of the cylindrical body 8. In other words, the O-ring 47 functions as a member for preventing drop-off of the cylindrical body 8. Thus, it becomes possible to effectively prevent the cylindrical body 8 from dropping off from the through-hole 4b of the carrier 4 (the end-plate penetrating zone 39). In addition, the cylindrical body 8 can be installed to the carrier 4 by inserting the cylindrical body 8 having the O-ring 47 fitted thereonto, into the through-hole 4b of the carrier 4, so that it becomes possible to assemble the basal section 32 and the end plate section 34 together, and then install the cylindrical body 8 thereto. Furthermore, it eliminates the need for a high degree of dimensional control for the carrier 4 and the cylindrical body 8. Thus, it becomes possible to suppress the situation where a gear device production operation becomes cumbersome and complicated.

In the above embodiment, respective depths of the outward groove 43 and the inward groove 45 are different from each other. This makes it possible to avoid a situation where corners of the outward groove 43 and the inward groove 45 exert a force on a thicknesswise central portion of the O-ring 47 to cause tearing of the O-ring 47.

In the above embodiment, the inward groove 45 is formed in the axially intermediate portion 8a of the cylindrical body 8, and the cylindrical body 8 is formed such that the end portion thereof has an outer diameter less than that of the intermediate portion 8a. This allows the end portion of the cylindrical body 8 to become less likely to collide with the inner peripheral surface of the end-plate penetrating zone 39 of the through-hole 4b of the carrier 4, during an operation of inserting the cylindrical body 8 into the end-plate penetrating zone 39.

In the above embodiment, each of the outward groove 43 and the inward groove 45 is a rectangular groove, and the inner peripheral surface of the through-hole 4b of the carrier 4 has an axial edge subjected to chamfering. This allows the O-ring 47 fitted onto the cylindrical body 8 to smoothly pass through the chamfered axial edge of the through-hole 4b (the inclined portion 39b of the end-plate penetrating zone 39). Thus, it becomes possible to smoothly perform an operation of installing the cylindrical body 8 to the carrier 4. Further, each of the outward groove 43 and the inward groove 45 for installing the O-ring 47 therein is formed in a rectangular shape, so that it becomes possible to prevent the O-ring 47 installed in the grooves from easily escaping from the grooves. This allows the cylindrical body 8 to become less likely to drop off from the through-hole 4b (end-plate penetrating zone 39).

The present invention is not limited to the above embodiment, but various changes and modifications may be made therein without departing from the spirit and scope of the present invention as set forth in appended claims. For example, the gear device may be configured such that the carrier 4 is fastened to the turning body 52, and the outer cylinder 2 is fixed to the base 50.

The cylindrical body 8 may be configured to protrude outwardly from the basal section 32, instead of protruding outwardly from the end plate section 34. In this case, the gear device may be configured such that the end plate section 34 is formed with a stepped portion, and the end portion of the cylindrical body 8 is brought into contact with the stepped portion of the end plate section 34, wherein the basal-section penetrating zone 38 of the basal plate portion 32a is formed with an outward groove 43 and an inclined portion. The inclined portion is formed at an end of the basal-section penetrating zone 38 on a side opposite to the end plate section 34.

In the above embodiment, the gear device is provided with the plurality of crankshafts 20. Alternatively, the gear device may be provided with only one crankshaft 20.

Although the above embodiment has been described based on an example where the oscillating gear is composed of an externally toothed gear, the present invention is not limited thereto. For example, the oscillating gear may be composed of an internally toothed gear, and a second member to be fastened to the second counterpart member (e.g., the turning member 52) may be composed of an externally toothed gear having external teeth meshed with internal teeth of the oscillating gear. In this case, the crankshaft 20 for oscillatingly rotating the oscillating gear may be configured such that it is rotatably supported by a first member to be fastened to the first counterpart member (e.g., the base 50).

An outline of the above embodiment will be described below.

(1) In the gear device according to the above embodiment, the cylindrical body has an outer peripheral surface formed with an inward groove, and the through-hole 4*b* of the second member has an inner peripheral surface formed with an outward groove, wherein the gear device is provided with an O-ring disposed to extend from an inside of the inward groove and an inside of the outward groove. Thus, even if the cylindrical body is urged to be displaced in an axial direction thereof with respect to the second member, the O-ring is brought into contact with respective wall surfaces of the inward groove and the outward groove, so that it becomes possible to restrict the axial displacement of the cylindrical body. In other words, the O-ring functions as a member for preventing drop-off of the cylindrical body. Thus, it becomes possible to effectively prevent the cylindrical body from dropping off from the through-hole of the second member. In addition, the cylindrical body can be installed to the second member by inserting the cylindrical body having the O-ring fitted thereonto, into the through-hole of the second member. Thus, even in the case where the second member comprises an assembly of a basal section and an end plate section, the cylindrical body can be installed to the second member after the assembling of the second member. Furthermore, it eliminates the need for a high degree of dimensional control for the second member and the cylindrical body. This becomes possible to suppress the situation where a gear device production operation becomes cumbersome and complicated.

(2) Respective depths of the outward groove and the inward groove may be different from each other. This feature makes it possible to avoid a situation where corners of the outward groove and the inward groove exert a force on a thicknesswise central portion of the O-ring to cause tearing of the O-ring.

(3) The inward groove may be formed in an axially intermediate portion of the cylindrical body, wherein the cylindrical body may be formed such that an end portion thereof has an outer diameter less than that of the intermediate portion. This feature allows the end portion of the cylindrical body to become less likely to collide with the inner peripheral surface of the through-hole of the second member, during an operation of inserting the cylindrical body into the through-hole of the second member.

(4) Each of the outward groove and the inward groove may be a rectangular groove, and the inner peripheral surface of the through-hole of the second member has an axial edge subjected to chamfering. This feature allows the O-ring fitted onto the cylindrical body to smoothly pass through the chamfered axial edge of the through-hole. Thus, it becomes possible to smoothly perform an operation of installing the cylindrical body to the second member. Further, each of the outward groove and the inward groove for installing the O-ring therein is formed in a rectangular shape, so that it becomes possible to prevent the O-ring installed in the grooves from escaping from the grooves. This allows the cylindrical body to become less likely to drop off from the through-hole.

As above, the gear device according to the above embodiment of the present invention can reliably prevent drop-off of the cylindrical body while suppressing the situation where a production operation for the gear device becomes cumbersome and complicated.

The invention claimed is:

1. A gear device installable between two counterpart members to transmit a rotational force while reducing a rotational speed at a predetermined speed reduction ratio, the gear device comprising:

a first member fixable to one of the counterpart members;

a crankshaft;

a second member configured to be fixable to the other counterpart member and formed with a through-hole, the second member being adapted to be relatively rotated with respect to the first member in interlocking relation with rotation of the crankshaft; and a cylindrical body disposed in the through-hole of the second member, wherein:

the second member has a basal section and an end plate section fastened to the basal section, the through-hole includes a basal-section penetrating zone formed in the basal section and an end-plate penetrating zone formed in the end plate section, the end-plate penetrating zone of the through-hole of the second member has an inner peripheral surface formed with an outward groove, the cylindrical body has an outer peripheral surface formed with an inward groove in opposed relation to the outward groove of the second member, the inward groove having two wall surfaces opposed in an axial direction of the cylindrical body, the gear device is provided with an O-ring disposed to extend from an inside of the outward groove to an inside of the inward groove, and the outward groove has two wall surfaces opposed in an axial direction of the cylindrical body, one of the two wall surfaces on an opposite side of the basal section having a height dimension less than that of the other of the two wall surfaces, the two wall surfaces of the inward groove and the two wall surfaces of the outward groove being aligned in a direction perpendicular to the axial direction of the cylindrical body, each of the two wall surfaces of the inward groove and each of the two wall surfaces of the outward groove being configured to contact the O-ring.

2. The gear device as defined in claim 1, wherein respective depths of the outward groove and the inward groove are different from each other.

3. The gear device as defined in claim 1, wherein the inward groove is formed in an axially intermediate portion of the cylindrical body, and wherein the cylindrical body is formed such that an end portion thereof has an outer diameter less than that of the intermediate portion.

4. The gear device as defined in claim 1, wherein:

each of the outward groove and the inward groove is a rectangular groove; and the inner peripheral surface of the through-hole of the second member has an axial edge subjected to chamfering.

* * * * *